United States Patent [19]

Brown et al.

[11] Patent Number: 4,892,158
[45] Date of Patent: Jan. 9, 1990

[54] THREE POINT COUPLING ARRANGEMENT FOR A TRACTOR

[75] Inventors: Thomas R. Brown, Plainfield, Ill.; Daniel D. Morrow, Burlington, Iowa

[73] Assignee: J. I. Case Company, Racine, Wis.

[21] Appl. No.: 16,150

[22] Filed: Feb. 18, 1987

[51] Int. Cl.[4] .......................................... A01B 59/043
[52] U.S. Cl. ..................................... 172/443; 91/444; 91/520; 172/450
[58] Field of Search ............... 172/439, 443, 450, 451; 280/446 A, 456 A, 460 A, 461 A, 446.1, 456.1, 460.1, 461.1; 91/444, 520

[56] References Cited

U.S. PATENT DOCUMENTS

| 2,743,656 | 5/1956 | Fraga | 172/450 X |
| 3,207,233 | 9/1965 | Shumaker | 280/461 A X |
| 3,627,053 | 12/1971 | Hook et al. | 172/9 |
| 3,750,757 | 8/1973 | Saetti | 280/461 A X |
| 4,433,735 | 2/1984 | Clark | 172/443 |

Primary Examiner—Richard T. Stouffer
Attorney, Agent, or Firm—Dykema Gossett

[57] ABSTRACT

A three point implement hitch arrangement for a tractor including a frame assembly, a pair of draft arms pivotally supported on the frame assembly intermediate their ends and lift cylinders having a cylinder portion pivotally supported on the frame assembly above the draft arms and having a rod portion pivotally connected to the draft arms, forwardly of the draft arm pivotal connections. The lift cylinders are connected in series, wherein the area of the rod end of one cylinder is equal to the area of the head end of the second cylinder, whereby the cylinders may be operated independently to tilt the implement or operated in unison to lift the implement, eliminating the requirement for a complex structural support and control.

1 Claim, 4 Drawing Sheets

THREE POINT COUPLING ARRANGEMENT FOR A TRACTOR

BACKGROUND OF THE INVENTION

The present invention relates to a three point coupling or implement hitch arrangement for a tractor and the control for lifting and tilting the draft arms of a three point hitch.

The prior art includes numerous examples of tractor mounted three point hitch arrangements which are commonly used to support, adjust and pull various agricultural and industrial implements. Typical agricultural implements which are generally mounted on a three point hitch include plows, disks, cultivators and rotary hoes, which may be interchanged for use. A three point hitch assembly normally includes a pair of drawbar links or draft arms which are pivotally supported in spaced relation at their forward ends on the tractor. The arms are raised or lowered about their forward pivotal axes by a hydraulic lift assembly mounted on the tractor. The conventional three point hitch arrangement includes a pair of upper arms mounted in spaced relation on a transverse rock shaft. The upper arms extend from the rock shaft above the draft arms which are pivotally connected at their forward ends on a frame assembly attached to the tractor. Draft arm links are connected between the free ends of the upper arms and the draft arms and a lift cylinder is connected between the frame assembly and the rock shaft to raise or lower the free ends of the draft arms. One of the draft links may be replaced with a leveling cylinder to provide relative adjustment of the draft arms or leveling of the draft arms.

U.S. Pat. No. 3,750,757 discloses a three point hitch arrangement of this general type wherein the draft arms are raised, lowered or tilted by hydraulic lift cylinders. A lift cylinder is pivotally supported above each of the draft arms on a plate mounted on the back of the tractor. The rod portion of the lift cylinders are mounted to the midportion of the draft arms for controlling the angular position of the draft arms about the forward transverse pivotal axes. The lift cylinders are hydraulically connected in series, such that upon movement of one of the cylinders there is a transfer of fluid between the two cylinders to cause the second cylinder to move with the first cylinder with the volume of hydraulic fluid transferred from one cylinder to the other being variable to vary the relative inclination of the draft arms. As disclosed, this is a relatively complex system wherein the unequal movement of the cylinders and draft arms is compensated by rods connected to the draft arms which are connected to links, levers and valves. The system includes a transverse stabilization distributor which senses a pressure drop in the line interconnecting the hydraulic cylinders and compensating for a load shift. It is the primary object of the present invention to simplify the control of the draft arms to provide lift and tilt movement of the draft arms without a complex mechanical and hydraulic control.

As described below, the hydraulic lift arrangement of the present invention preferably includes two lift cylinders which are connected in series wherein the area of the rod end of the first cylinder is equal to the area of the head end of the second cylinder, such that the cylinders may be actuated to move in unison without complex hydraulic and mechanical controls as described in the above-referenced U.S. patent. As will be understood, however, the prior art also includes hydraulic lift arrangements and controls having hydraulic cylinders connected in series, wherein the displacement of the cylinders are matched so that movement of any piston rod is accompanied by equal movement of the other piston rods as, for example, disclosed in U.S. Pat. No. 3,627,053. Reference is also made to U.S. Pat. No. 3,762,480 which discloses a hydraulic control apparatus for maintaining an agricultural implement level with the ground having hydraulic cylinders connected in parallel of unequal sizes.

The third connection of the three point coupling or hitch arrangement is provided by an arm or link pivotally supported on the back of the tractor above and between the draft arms. Where pitch adjustment is desired, a turnbuckle may be utilized for manual pitch adjustment of the implement or a hydraulic pitch cylinder has been used for pitch adjustment of the implement. As will now be understood, the need remains for a three point coupling or implement hitch arrangement for a tractor, which is relatively simple in construction and control, wherein the draft arms may be independently controlled to lift or tilt the implement.

SUMMARY OF THE INVENTION

The three point coupling or implement hitch of this invention is particularly, although not exclusively, adapted for mounting various implements on a tractor. The three point coupling arrangement of this invention is relatively simple in construction, efficient and includes a relatively simple control which does not require mechanical linkages and sensing devices. The three point coupling arrangement is supported on a frame assembly mounted on the tractor, wherein the draft arms are pivotally supported in spaced relation on the frame assembly intermediate the ends of the draft arms, such that the draft arms include portions extending forwardly and rearwardly from the pivotal connection on the frame. The coupling arrangement includes a pair of fluid lift cylinders each having a cylinder portion preferably pivotally supported on the frame assembly above one of the draft arms and a rod portion which is pivotally connected to the draft arm, spaced forwardly of the pivotal draft arm support. Thus, the rearward free ends of the draft arms are raised by extending the lift cylinders, rather than retracting the cylinders as disclosed in the prior art. This is a more efficient arrangement because a fluid cylinder, such as a hydraulic cylinder, has greater force at the head end, as compared to the rod end. In the most preferred embodiment, the lift cylinders are each pivotally supported on the frame assembly on a transverse pivot axis which is parallel to the pivot axis of the draft arm but is located above and rearwardly of the pivot axis of the rod end to the draft arm. Thus, the lift cylinders extend downwardly and forwardly, providing an efficient compact arrangement.

The control means for the three point coupling arrangement of this invention preferably includes a fluid communication between the rod end of one cylinder and the head end of the second cylinder, interconnecting the lift cylinders in series, wherein the area of the rod end of the first cylinder is generally equal to the area of the head end of the second cylinder. The lift cylinders may therefore be moved in unison without requiring complex controls. The control further includes a lift valve or valve section in fluid communication with the head end of the first cylinder and the rod end of the second cylinder, whereby the lift cylinders may be actuated in unison to raise or lower the rearward free ends of the draft arms as described. The preferred control further includes a tilt valve or valve section providing fluid communication between the rod and head ends of one of the lift cylinders, such that the cylinder may be actuated independently to tilt the implement. In the most preferred embodiment, the tilt valve includes a restrictor to limit the flow of fluid and the speed of the tilt. Thus, the control for the three point coupling arrangement of this invention is relatively simple, compact, efficient and relatively maintenance free.

The frame assembly of the three point coupling assembly of this invention is also rugged in construction. The draft arms are preferably mounted on the frame assembly in angular relation with the arms extending radially outwardly relative to the longitudinal axis of the tractor. As described, the transverse pivotal support of the lift cylinders are parallel to the pivotal support of the draft arm to which the lift cylinder connects. In the most preferred embodiment, the frame assembly includes angularly related side plates which extend parallel to the adjacent draft arm and the draft arms and lift cylinders are pivotally supported on the side plates. In the most preferred embodiment, the frame assembly further includes an upper and lower cross member which interconnect the side plates and the inside ends of the pivot pins which provide the pivotal supports for the draft arms and lift cylinders are supported on the cross members.

The third connector of the disclosed three point coupling arrangement is a pitch cylinder having a cylinder portion which is pivotally supported on the frame assembly between the pivotal supports of the lift cylinders. The three point coupling arrangement thus provides hydraulic lift, tilt and pitch adjustment of the implement in a relatively simple, compact arrangement. The three point coupling arrangement of this invention therefore solves many of the problems of the prior art in a simple, efficient and compact arrangement and the control for lifting, tilting and pitching the implement is relatively simple and trouble free. Other advantages and meritorious features of the present invention will be more fully understood from the following description of the preferred embodiments, the appended claims and the drawings, a brief description of which follows.

DETAILED DESCRIPTION OF THE PREFERRED EMBODIMENTS OF THE INVENTION

Figure 5:
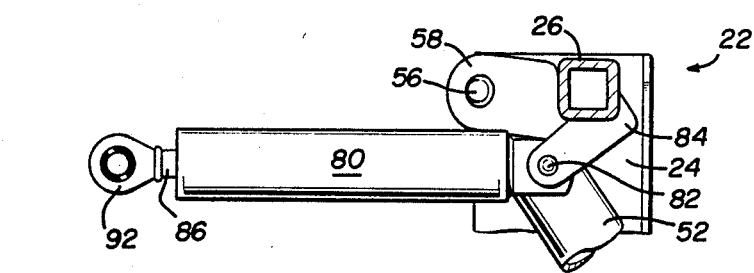
FIG. 5 is a partial side cross-sectional view of the three point coupling arrangement shown in FIG. 2, in the direction of view arrows 5—5.
Figure 4:
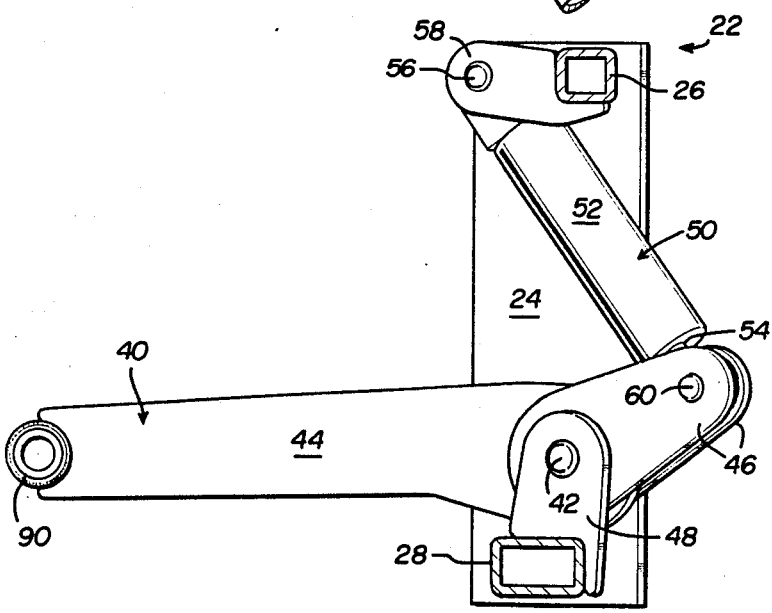
FIG. 4 is a side cross-sectional view of the three point coupling arrangement shown in FIG. 2, in direction of view arrows 4—4.

The embodiment of the three point coupling or implement hitch arrangement 20 shown in the drawings includes a frame assembly 22 having side members or plates 24, an upper cross member 26, a lower cross member 28 and side flange members 30. As shown in FIGS. 4 and 5, the cross members 26 and 28 may be in the form of hollow tubes and the frame assembly 22 may be formed as an integral construction wherein the side members 24 are welded to the cross members 26 and 28 and the side flange members 30 are welded to the side members as shown by weld 34 in FIG. 1. The frame assembly is bolted or otherwise attached to the rear of a tractor or other primary mover and bolt holes 32 are provided in the side flange members 30 for such attachment. As used herein, "tractor" is intended as a generic term, including various prime movers, including agricultural tractors, caterpillar tractors and other agricultural and industrial vehicles.

Draft arms 40 are pivotally supported on transverse pivot pins 42 on the frame assembly. In the disclosed embodiment, the draft arms include a rearwardly projecting arm portion 44 and forwarding projecting ear portions 46. As used herein, "forwardly" and "rearwardly" refer to the projection of the arm portions relative to the transverse pivot axis 42 and the normal direction of the tractor. Thus, the arm portions 44 project "rearwardly" from pivot axis 42 and ear portions 46 project "forwardly from pivot axis 42. In the disclosed embodiment, the ear portions 46 are welded to the center arm portion 44, providing an integral draft arm 40 which is pivotally supported on the frame assembly intermediate the free ends of the draft arms. The outer ends of the pivot pins 42 are supported on the side frame members 24 and the inner ends are supported on ears 48 which are welded or otherwise attached to the lower cross member 28 as best shown in FIGS. 1 and 4.

The draft arms 40 are "raised" and "lowered" by actuation of lift cylinders 50. The lift cylinders include a cylinder portion 52 and a piston rod or rod portion 54. The cylinder portion of each lift cylinder 50 is pivotally supported on a transverse pivot pin 56. The outer end of the pivot pin 56 is supported on the side frame member 24 and the inner end is supported by an ear 58 which is welded or otherwise attached to the upper cross member 26 as best shown in FIGS. 1 and 4. The eye of the piston rod 54 is pivotally attached to the forwardly projecting ear portions 46 of the draft arms 40 by a transverse pivot pin 60. As best shown in FIGS. 3 and 4, the transverse pivot axes 56 of the lift cylinders is located above and rearwardly of the pivot axes 42 of the draft arms 40. Thus, the lift cylinders 50 extend downwardly and forwardly, providing an efficient compact assembly. Further, as best shown in FIG. 2, the draft arms 40 are angularly related, extending radially relative to the longitudinal axis 62 of the tractor. The side plates 24 are also angularly related, each extending generally parallel to the longitudinal axis of the adjacent draft arm 40. Further, the pivot axes of the pivot pins 56 and 60 are parallel to the pivot axis 42 of the draft arm to which the lift cylinder is attached. As described more fully in the description of the operation of the three point hitch assembly of this invention, the lift cylinders 50 may then be actuated to rotate the draft arms 40 about pivot axes 42.

Figure 1:
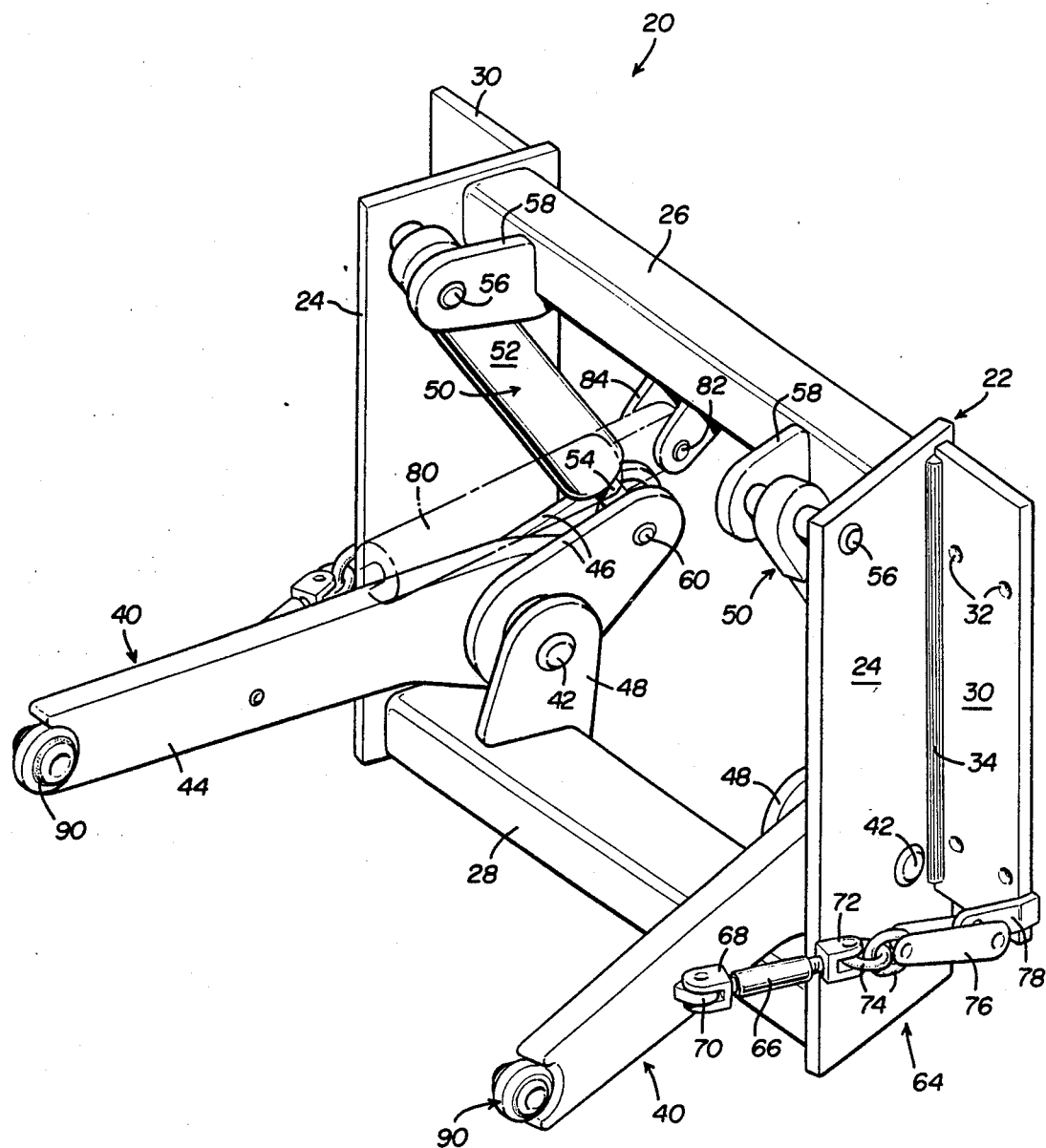
FIG. 1 is a rear perspective view of a preferred embodiment of the three point coupling arrangement of this invention.
Figure 2:
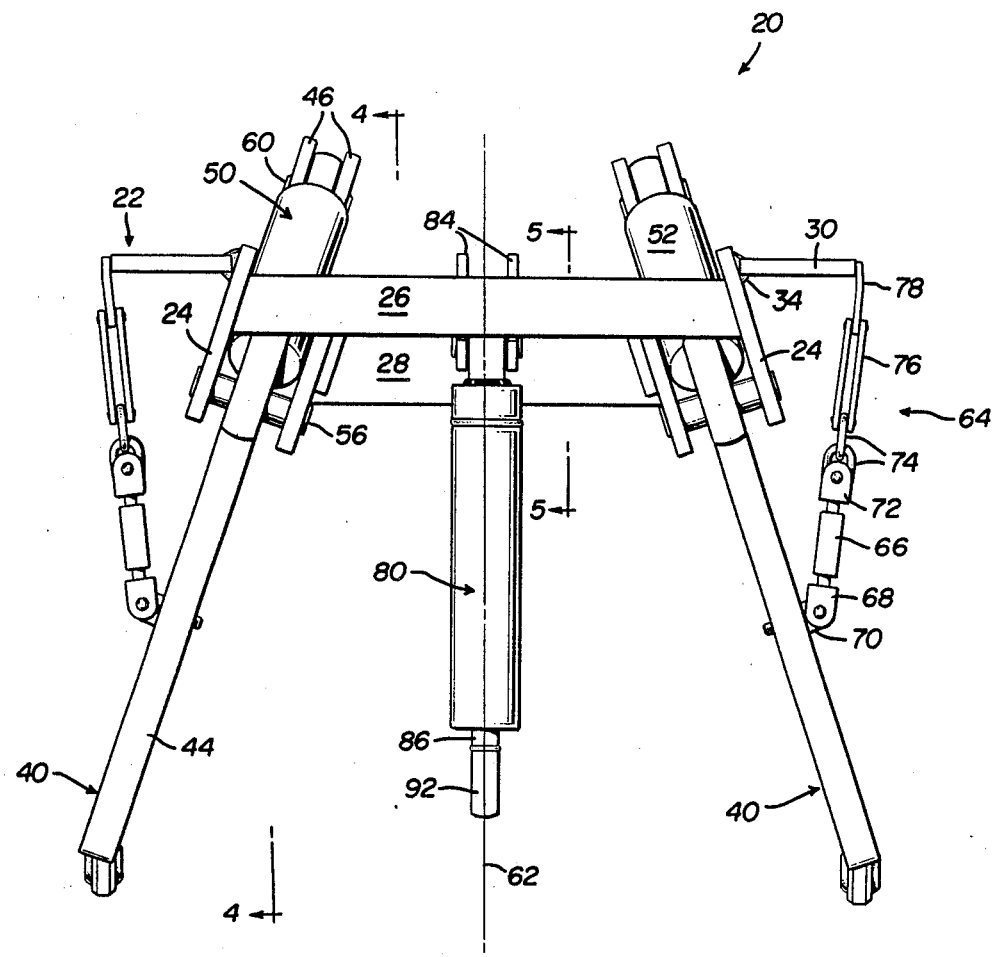
FIG. 2 is a top view of the three point coupling arrangement shown in FIG. 1.
Figure 3:
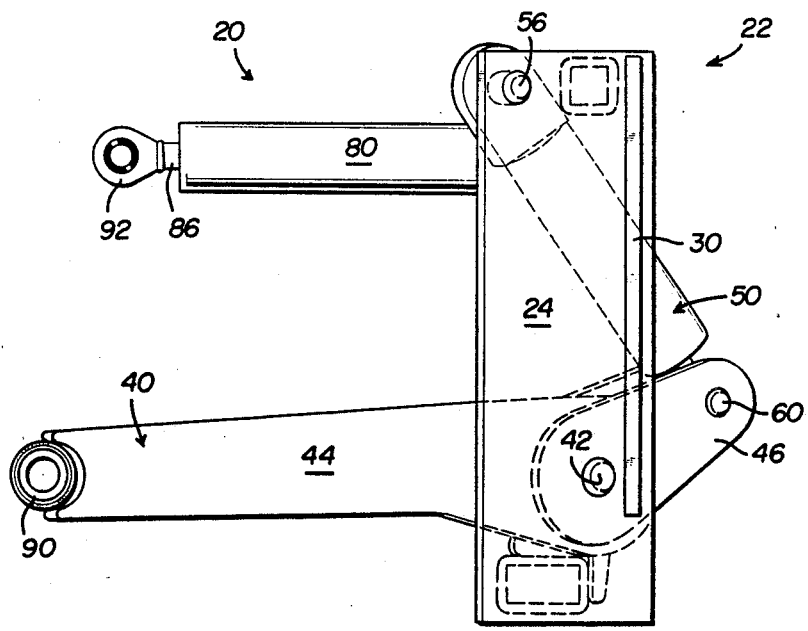
FIG. 3 is a side view of the three point coupling arrangement shown in FIGS. 1 and 2.

The disclosed embodiment of the three point hitch assembly includes a side stabilizing linkage 64 as shown in FIGS. 1 and 2. The linkage includes a turnbuckle 66 which may be manually extended or retracted to adjust the angular relation of the draft arms 40 and prevent side sway. The turnbuckle is attached by a clevis 68 to an ear 70 which is bolted or otherwise attached to the draft arm 40. The opposite end of the turnbuckle is attached by clevis 72 to a pair of rings 74 to a link 76, which in turn is attached to an ear 78, which is welded or otherwise attached to the side flange members 30 of the frame assembly. The rings 74 permit universal movement of the linkage assembly for linear adjustment by rotation of the turnbuckle 66. The stabilizing linkage 64 thus provides for adjustment of the angular relation between the draft arms 40 and prevents sideward swinging of the arms.

In the disclosed embodiment of the three point hitch assembly of this invention, the third connection of the three point hitch is provided by a pitch cylinder 80. The pitch cylinder is pivotally supported by a transverse pivot pin 82 which is supported by opposed ears 84 welded or otherwise attached to the top or upper cross frame member 26, as shown in FIG. 5. The three points of the hitch assembly thus include the ball joints 90 located at the ends of the draft arms 44 and the eye 92 at the end of the piston rod 86 of the pitch cylinder 80. As will be understood, the pitch cylinder 80 may be extended or retracted to "pitch" the implement supported on the three point hitch assembly, however, the use of a pitch cylinder is conventional with three point hitch assemblies. Further, a manually-adjustable turnbuckle or rigid arm may be substituted for the pitch cylinder depending upon the specific application.

Figure 6:
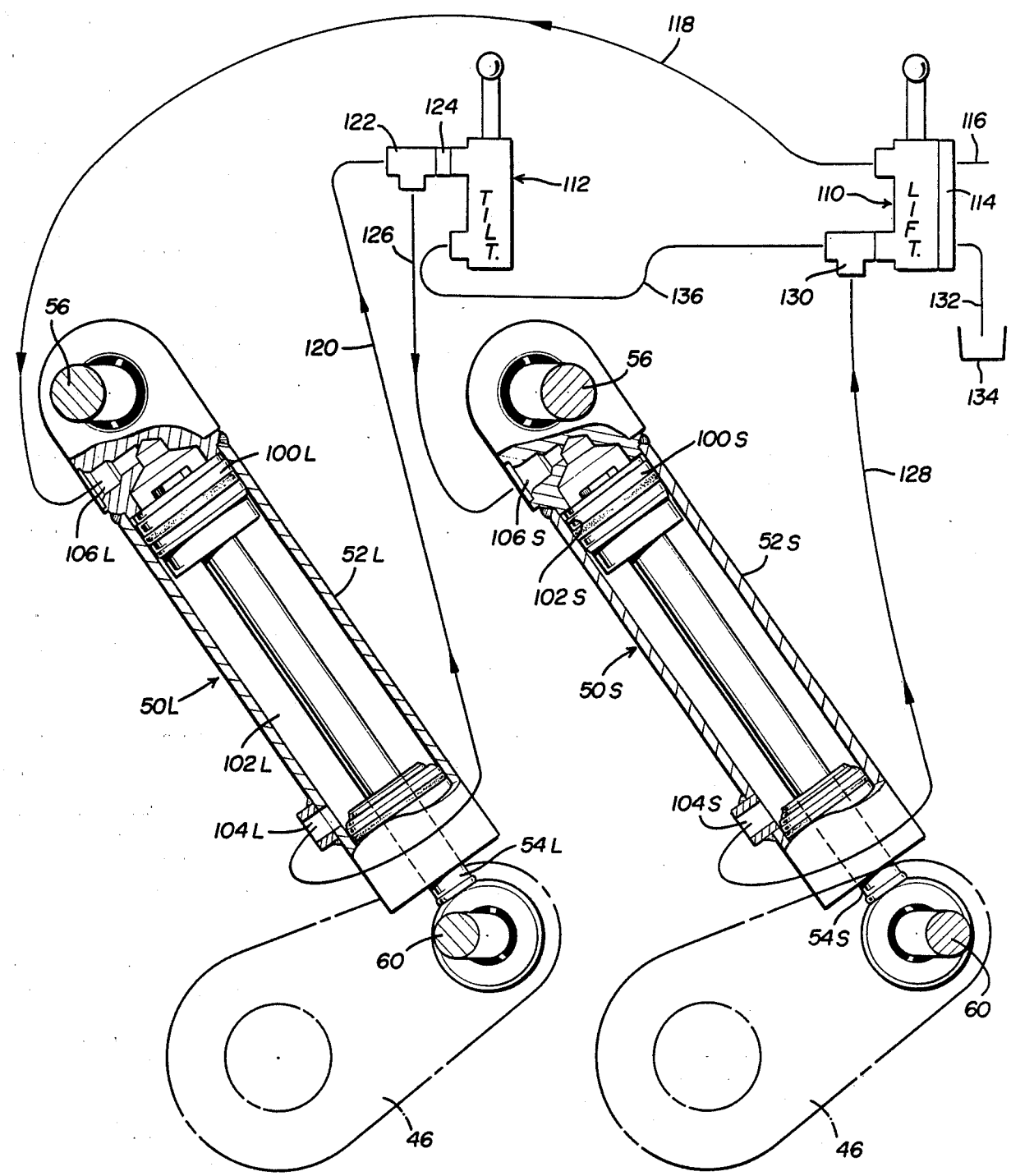
FIG. 6 is a partially cross-sectioned perspective view of the lift couplings in the arrangement shown in FIGS. 1 to 5, including a schematic of the fluid control.

The operation of the three point hitch assembly will be more fully understood from FIG. 6 which includes a schematic of the fluid control circuit. The lift cylinders 50L (large) and 50S (small) are shown in their general orientation in the three point hitch assembly. As described above, the cylinder portion 52 is pivotally supported at its upper end on a transverse pivot pin 56 and the eye of the piston rod 54 is connected to the forwardly extending ear portions 46 of the draft arms by pivot pins 60. Each cylinder includes a piston head, 100L and 100S, which reciprocates within the cylinder portion, 52L and 52S, respectively, upon fluid actuation of the lift cylinders. The lift cylinders may be conventional hydraulic piston cylinders, except that the area 102L of the rod end of the larger cylinder 50L is equal to the area 102S of the head end of the smaller cylinder 50S. Thus, when the lift cylinders are connected in series, wherein fluid discharge from the port 104L at the rod end of the larger cylinder is transferred to the port 106S at the head end of the smaller cylinder 50S, the lift cylinders will move in unison. That is, the movement of the piston rod 54L will be equal to the movement of the other piston rod 54S, regardless of the relative positions of the piston rods.

The fluid control circuit includes a lift valve or valve section 110 and a tilt valve or valve section 112. As will be understood, the valve sections 110, 112, 114 and the pitch valve section (not shown) are normally bolted together so that the valve sections communicate, however, valve stacking is old in the art and need not be described here. The lift cylinders are operated in unison to raise an implement supported on the ball joints 90 (see FIG. 1) by extending the lift cylinders, as now described. Hydraulic fluid is received in valve section 114 through line 116 and transferred through line 118 in the direction of the arrows. The fluid is then received in the port 106L at the head end of the larger cylinder 60L, moving the piston head 100L downwardly, extending the piston rod 54L. The fluid is then discharged from the rod end 102L through portion 104L into line 120 where it is received in the T-connector 122. A restrictor 124 limits the flow of the fluid to the tilt valve 112 and the fluid is thus transferred through line 126 to the head end of the smaller cylinder 50S through head end port 106S. The pressure on the piston head 100S then extends the piston rod 54S. The displaced fluid is then discharged out of port 104S through line 128 to the T-coupling at the second port of the lift valve section where it is discharged through line 32 to reservoir 134. The valve sections 110 and 112 include conventional open center valve spools and tilt cylinder 112 is set in the "neutral" position during lifting. The draft arms are "lowered" by reversing the flow described above.

Alternatively, the implement supported on the draft arms may be "tilted" by independent operation of either lift cylinder, adjusting the relative positions of the piston rods. In the disclosed embodiment, the tilt valve section 112 may be operated to extend or retract the smaller cylinder 50S. As described, fluid under pressure is received through line 116 and transferred through line 136 to the tilt valve section 112. The fluid is then transferred through line 126 to the head end port 106 of the smaller cylinder, 50S. The fluid is then discharged through port 104 and line 128 to the lift valve section, which is in the neutral position. The fluid is then discharged through line 132 to reservoir 134. The valve restrictor 124 of the tilt valve section 112 has an additional function in the tilt circuit. As shown in FIG. 6, and described herein, the fluid passes through restrictor 124 in the tilt circuit which limits the speed of the extension or retraction of the piston rod 54S of the smaller cylinder 50S, which improves the control of the tilting of the implement. The restrictor 124 is a reduced diameter orifice, which is conventional in the valve art. The cylinder 50S may be retracted by operating the tilt valve section and transferring fluid in the opposite direction.

Having described the three point coupling or implement hitch arrangement and control of this invention, it is now possible to describe the operation of the hitch assembly. An implement attached to the ball joints 90 at the rearward ends of the draft arms 40 may be raised by extending the lift cylinders 50 by operation of the lift valve section 110, as described above. The extension of the lift cylinders rotates the lift arms 40 in a clockwise direction around the axes of pivot pins 42. It is important to note that the draft arms are "lifted" by extending the lift cylinders 50. As described above, a fluid piston, such as the hydraulic pistons 50, has a greater force at its head end as the cylinder is extended, as compared to the arrangement disclosed in the prior art where the draft arms are raised by retracting the pistons. Thus, the three point hitch arrangement is more efficient than the prior art. Alternatively, the draft arms are lowered by rotating the arms in a clockwise direction about pivot axes 42 by retracting the cylinders 50. Finally, the implement may be tilted by retracting or extending only one of the lift cylinders, adjusting the relative position of the piston rods 54. It is important to note that the implement may then be raised or lowered in the tilted position by simultaneously extending or retracting the lift cylinders 50. In the disclosed embodiment of the invention, wherein the area 102L at the rod end of the larger cylinder 50L is equal to the area 102S at the head end of the smaller cylinder 50S, the cylinders may be extended or retracted in unison even where the implement is tilted without requiring complex linkages, load sensors and independent distributor valves. The three point coupling of the present invention therefore provides a simple and efficient hitch arrangement in a compact form. As will be understood, various modifications may be made to the three point hitch arrangement of the present invention without departing from the purview of the appended claims. For example, the larger cylinder may be actuated independently to tilt the implement or a conventional hydraulic control may be utilized with the unique arm arrangement to lift and tilt the draft arms.

We claim:

1. A three point coupling arrangement for a tractor comprising a frame assembly, said frame assembly includes opposed side members, an upper cross member and a lower cross member, each of said cross members connected to said side members to form a generally rectangular frame, and side flange members connected to said side members, draft arms each pivotally supported to rotate about a first axis in spaced relation on said lower cross member intermediate the ends of said draft arms, fluid lift cylinders each having a cylinder portion pivotally supported on a pivot axis to rotate relative to said upper cross member above a respective one of said draft arms and having a rod portion pivotally connected to a respective one of said draft arms at a location spaced forwardly of said first axis, a third connector pivotally supported on said upper cross member intermediate said lift cylinders, free rearward ends of said draft arms and said third connector providing a three point coupling, and a control means for operating said lift cylinders, said control means including fluid connector means providing fluid communication between the rod end of one of said lift cylinders and the head end of a second one of said lift cylinders interconnecting said cylinders in series to permit operation of said lift cylinders in unison, the area of said rod end of said one cylinder being substantially equal to the area of said head end of said second cylinder, said control means operating said cylinders in unison to lift said rearward draft arm ends as said lift cylinders are extended and lower said rearward draft arm ends as said lift cylinders are retracted;

wherein said draft arms are angularly related, each of said arms extending rearwardly from said lower cross member radially outwardly from the longitudinal axis of said frame assembly, said first axes being transverse pivot axes supporting said draft arms on said lower cross member and said pivot axes of said lift cylinder portions being spaced above and parallel to said draft arm pivot axes and perpendicular to said draft arms;

wherein said opposed side members are angularly related, each said side member extending generally parallel to the adjacent one of said draft arms, said draft arms and said lift cylinders pivotally supported to said side members; and wherein said control means further includes a lift valve means in fluid communication with the head end of said one lift cylinder and the rod end of said second cylinder, and a tilt valve means in fluid communication with the rod and head ends of a selected one of said lift cylinders, whereby said selected lift cylinder may be operated by said tilt valve means to adjust the relative positions of said lift cylinders with respect to each other and said lift cylinders may be operated in unison by said lift valve means, and a valve restrictor connected to said tilt valve means for limiting the flow of fluid to said tilt valve means when said lift cylinders are operated in unison and said valve restrictor limiting the speed of extension or retraction of said selected lift cylinder when said tilt valve means is operated.

* * * * *